(12) United States Patent
Liou (10) Patent No.: US 9,162,351 B2
(45) Date of Patent: *Oct. 20, 2015

(54) MULTI-FUNCTION TOOL (76) Inventor: Mou-Tang Liou, Taichung (TW)

( * ) Notice: Subject to any disclaimer, the term of this patent is extended or adjusted under 35 U.S.C. 154(b) by 882 days.

This patent is subject to a terminal disclaimer.

(21) Appl. No.: 13/426,751

(22) Filed: Mar. 22, 2012

(65) Prior Publication Data

US 2012/0175574 A1 Jul. 12, 2012

Related U.S. Application Data

(63) Continuation-in-part of application No. 12/139,560, filed on Jun. 16, 2008, now Pat. No. 8,177,191.

(51) Int. Cl.
| | |
|---|---|
| *B66F 9/00* | (2006.01) |
| *B25F 1/00* | (2006.01) |
| *B25G 1/04* | (2006.01) |
| *B66F 15/00* | (2006.01) |
| *A01B 1/18* | (2006.01) |

(52) U.S. Cl.
CPC ... *B25F 1/00* (2013.01); *B25G 1/04* (2013.01); *B66F 15/00* (2013.01); *A01B 1/18* (2013.01)

(58) Field of Classification Search
USPC .......................................................... 254/25
See application file for complete search history.

(56) References Cited

U.S. PATENT DOCUMENTS

| | | | | |
|---|---|---|---|---|
| 404,001 A | 5/1889 | Heacock | ............................ | 7/139 |
| 540,967 A | 6/1895 | Eveleth | ........................ | 254/26 E |
| 780,305 A | 1/1905 | Riggin | ............................ | 81/144 |
| 856,097 A | 6/1907 | Palmer | ......................... | 254/26 E |
| 885,363 A | 4/1908 | Myers | ............................... | 81/145 |
| 1,132,879 A | 3/1915 | Rairden | ....................... | 254/26 E |
| 1,402,470 A * | 1/1922 | Bauer | ............................... | 30/429 |
| 2,638,244 A * | 5/1953 | Baisch | ........................... | 220/274 |
| 2,643,854 A | 6/1953 | Johnson | ....................... | 254/26 E |
| 2,804,109 A | 8/1957 | Fatica | .......................... | 30/308.1 |
| 2,876,776 A * | 3/1959 | Williams | .......................... | 606/1 |
| 3,219,316 A * | 11/1965 | Fried | .............................. | 254/131 |
| 3,629,883 A * | 12/1971 | Norman | ........................... | 7/170 |
| 3,852,839 A * | 12/1974 | Blessing | ........................... | 7/100 |
| 5,044,033 A * | 9/1991 | Fosberg | ............................ | 7/166 |
| 5,249,776 A | 10/1993 | Johnson | ...................... | 254/26 E |
| 5,280,738 A | 1/1994 | Liou | .................................. | 81/20 |
| 5,845,354 A | 12/1998 | Long et al. | ........................ | 7/139 |
| 5,871,204 A | 2/1999 | Spirer | .......................... | 254/26 R |
| 6,058,814 A | 5/2000 | Johnson | ........................ | 81/177.2 |
| 6,827,333 B1 | 12/2004 | Lutz | .............................. | 254/26 E |
| 7,025,331 B2 | 4/2006 | Whelan | ............................ | 354/25 |
| 7,063,168 B2 * | 6/2006 | Paloheimo et al. | ........... | 172/378 |

(Continued)

*Primary Examiner* — Lee D Wilson
*Assistant Examiner* — Alvin Grant
(74) *Attorney, Agent, or Firm* — Alan D. Kamrath; Kamrath IP Lawfirm, P.A.

(57) ABSTRACT

A multi-function tool includes a shank body, a pry bar, at least one clutch, a foot hold, and a fine adjustment mechanism. The shank body includes a plurality of located grooves. The pry bar includes a first receptacle adapted for the shank body inserted therethrough. The foot hold is mounted on the shank body. The fine adjustment mechanism for fine adjusting the pry bar is mounted on the shank body and engaged with the pry bar and includes at least one second receptacle. Furthermore, the at least one clutch is disposed in the at least one second receptacle and alternatively engaged with a selective one of the plurality of located grooves of the shank body Furthermore, the pry bar is adapted to be fine adjustably moved through a distance smaller than a pitch between two adjacent located grooves.

17 Claims, 8 Drawing Sheets

(56) References Cited

U.S. PATENT DOCUMENTS

| | | | |
|---|---|---|---|
| 7,278,626 B1 * | 10/2007 | Chang | 254/25 |
| 7,735,172 B2 | 6/2010 | Newton et al. | 7/166 |
| 7,736,172 B2 * | 6/2010 | Yang et al. | 439/358 |
| 7,774,882 B2 * | 8/2010 | Liou | 7/166 |
| 8,177,191 B2 * | 5/2012 | Liou | 254/25 |
| 8,201,806 B2 | 6/2012 | Liou | 254/27 |
| 8,550,437 B2 * | 10/2013 | Liou | 254/250 |
| 2004/0045416 A1 | 3/2004 | Liou | 81/177.1 |
| 2009/0008614 A1 * | 1/2009 | Adams et al. | 254/25 |
| 2009/0050861 A1 | 2/2009 | Noah et al. | 254/26 E |
| 2009/0307847 A1 | 12/2009 | Liou | 7/166 |
| 2010/0207081 A1 | 8/2010 | Liou | 254/129 |
| 2010/0314593 A1 * | 12/2010 | Fan | 254/25 |
| 2014/0145127 A1 * | 5/2014 | Su | 254/129 |

* cited by examiner

MULTI-FUNCTION TOOL

CROSS REFERENCE TO RELATED APPLICATION

The present application is a continuation-in-part application of U.S. patent application Ser. No. 12/139,560 filed on Jun. 16, 2008, now U.S. Pat. No. 8,177,191, of which the entire disclosure is incorporated herein.

BACKGROUND OF THE INVENTION

1. Field of the Invention

The present invention relates to a multi-function tool adapted for pulling and prying a nail. More particularly, the present invention relates to a multi-function tool including a shank body and a pry bar adjustably mounted on the shank body.

2. Description of the Related Art

A conventional tool for pulling a nail and prying a material from a surface includes a pry bar formed on an end thereof and a handle formed on another end thereof. However, the tool is usually formed as one piece, and the distance between the pry bar and the handle cannot be adjusted. Therefore, the tool is just adapted for pulling nails whose size is limited to a particular range, and if a nail whose size is over the range, the tool could not used to pull out the nail fully. Moreover, if a user operates the tool to pry something on a narrow place, it is difficult to find a fulcrum for supporting the tool during the operation.

The present invention is, therefore, intended to obviate or at least alleviate the problems encountered in the prior art.

SUMMARY OF THE INVENTION

According to the present invention, a multi-function tool includes a shank body, a pry bar, at least one clutch, a foot hold, and a fine adjustment mechanism. The shank body includes a first end, a second end opposite to the first end, and a plurality of located grooves formed thereon and longitudinally aligned between the first and second ends thereof. The pry bar includes a first section, a second section for prying, and a first receptacle longitudinally piercing the first section and adapted for the second end of the shank body inserted therethrough. The foot hold is mounted on the shank body. The fine adjustment mechanism for fine adjusting the pry bar is mounted on the shank body and engaged with the pry bar and includes at least one second receptacle transversely extended therein. Furthermore, the second end of the shank body is inserted through the first receptacle of the pry bar and installed to the foot hold. Furthermore, the at least one clutch is disposed in the at least one second receptacle and alternatively engaged with a selective one of the plurality of located grooves of the shank body to fix the pry bar to the shank body in position. Furthermore, the pry bar is adapted to be fine adjustably moved through a distance smaller than a pitch between two adjacent located grooves.

Other objects, advantages, and new features of the present invention will become apparent from the following detailed description of the invention when considered in conjunction with the accompanied drawings.

DETAILED DESCRIPTION OF THE PREFERRED EMBODIMENTS

FIGS. 1 through 8 show a multi-function tool of the present invention. The multi-function tool includes a hexagonal shank body 10, a pry bar 20 slidably mounted on the shank body 10 longitudinally, and at least one clutch 30. The at least one clutch 30 is adapted to couple the pry bar 20 to the shank body 10. Further, a foot hold 40 is installed to the bottom of the pry bar 20 and connected to the shank body 10.

Figure 1:
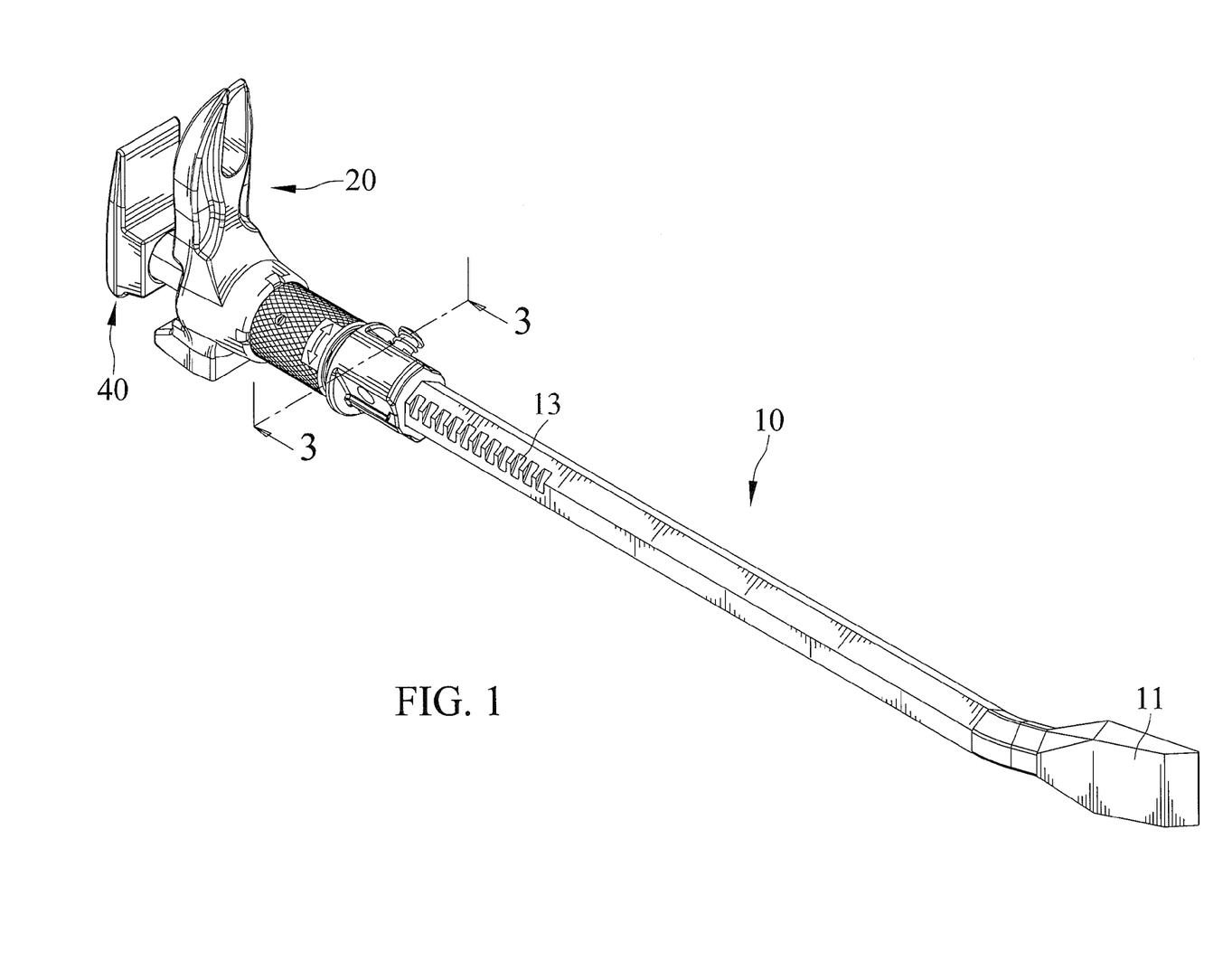
FIG. 1 is a perspective view of a multi-functional tool of the present invention.
Figure 2:
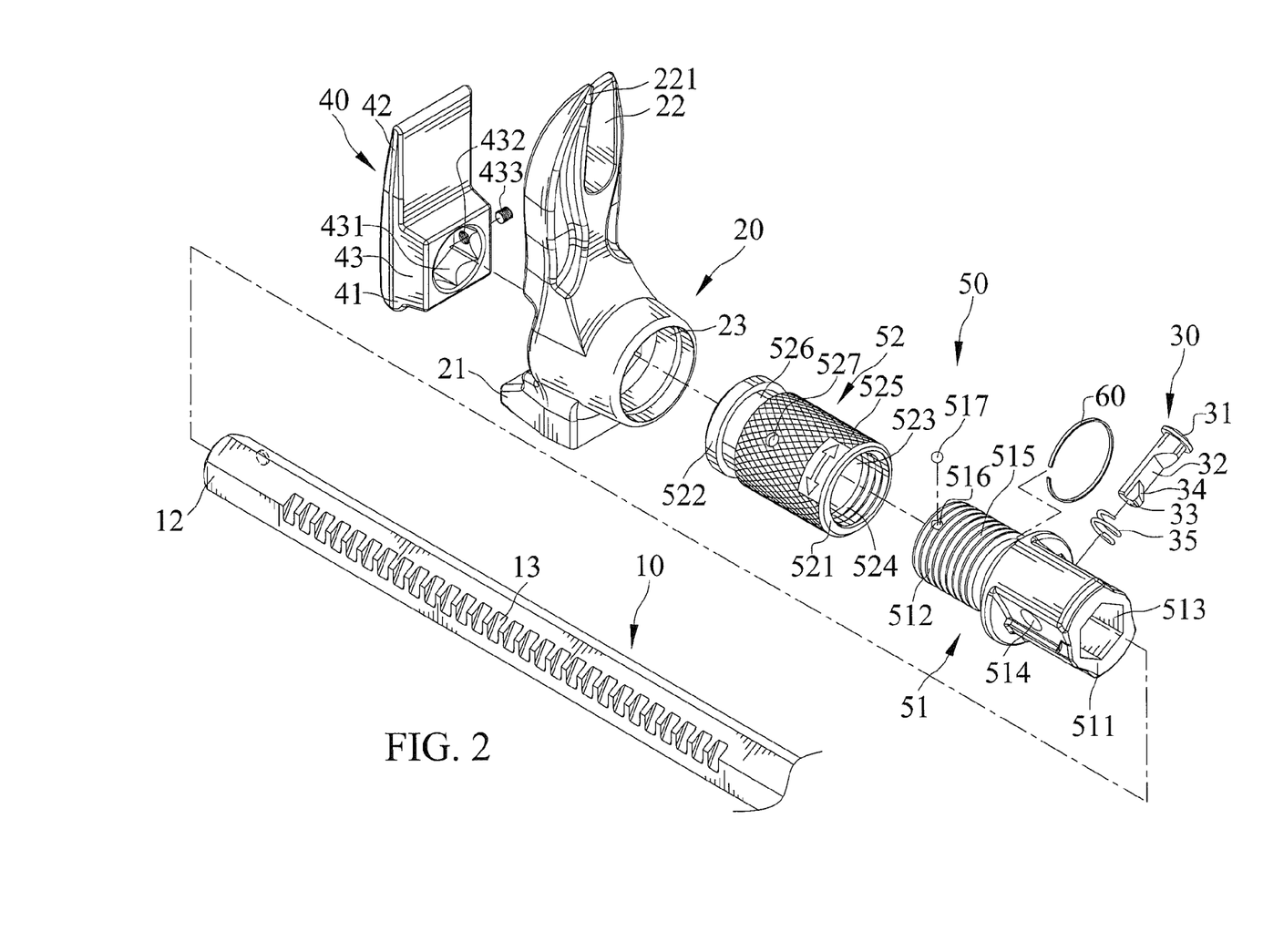
FIG. 2 is an exploded perspective view of the multi-functional tool shown in FIG. 1.

The shank body 10 includes a first end 11 and a second end 12 opposite to the first end 11. The first end 11 is in a form of a tip and adapted for loosening materials that are tightened together or breaking materials in an emergency. A plurality of located grooves 13 is defined on the outer periphery of the shank body 10, with the located grooves 13 aligned from the second end 12 to the first end 11, and with the interval between each of the located grooves 13 alternatively being constant or not.

The pry bar 20 includes a first section 21 mounted on the shank body 10, a second section 22 extending from an end of the first section 21, and a terminal end 25 projecting from another end of the first section 21 and opposite to the second section 22. A first receptacle 23 pierces the first section 21 and includes a length having a hexagonal cross section similar to a cross section of the shank body 10, with the direction of axis of the first receptacle 23 being parallel to that of the shank body 10. A prying portion 221 is defined on the terminal end of the second section 22 for separating materials which are nailed or otherwise fastened together. The second end 12 of the shank body 10 is inserted through the first receptacle 23 of the pry bar 20.

The at least one clutch 30 is in form of a column and is disposed in at least one second receptacle 514 transversely extended in the fine adjustment mechanism 50 to selectively engage with one of the located grooves 13 for fixing the pry bar 20 on the desired location of the shank body 10. The at least one clutch 30 includes a first end defining a flange 31 and a second end defining a protrusion 33 for exactly inserting into the one of the located grooves 13. An abutted surface 34 is defined on a side of the protrusion 33 so that when the protrusion 33 is inserted into one of the located grooves 13, the abutted surface 34 just abuts against the inner wall of the located groove 13 for a secure engagement of the pry bar 20 and the shank body 10. A sunken portion 32 is provided between the first and second ends of the at least one clutch 30. That is, the shank body 10 is through the at least one clutch 30 and set in the first receptacle 23 of the pry bar 20 without contact with the clutches 30. The at least one clutch 30 further includes an elastic element 35 mounted thereon and adjacent to the flange 31. When the at least one clutch 30 is in an engaging position and the elastic element 35 is released, the protrusion 33 is engaged with the one of the located grooves 13 and the abutted surface 34 abuts against the inner wall of the located groove 13 (shown in FIG. 3). When the at least one clutch 30 is in a disengaging position and the elastic element 35 is pressed, the protrusion 33 is disengaged from the located groove 13 and the abutted surface 34 is spaced from the inner wall of the located groove 13 (shown in FIG. 5).

The foot hold 40 is mounted on the shank body 10. The foot hold 40 includes a first section 41 and a second section 42 opposite to the first section 41, with the second section 42 adapted for prying. A connective portion 43 is formed on the first section 41 and includes a compartment 431 defined therein and in communication with the first receptacle 23, an opening 432 formed on the outer periphery thereof and corresponding to at least one fastener 433. The at least one fastener 433 is inserted through the compartment 431 and engaged with the shank body 10. The fastener 433 is provided to insert through the opening 432 to couple the foot hold 40 to the second end 12 of the shank body 10. Each of the fasteners 433 is in a form of a pin. Additionally, the second section 22 of the pry bar 20 with the cooperation of the second section 42 of the foot hold 40 is able to clamp materials with various sizes.

Figure 3:
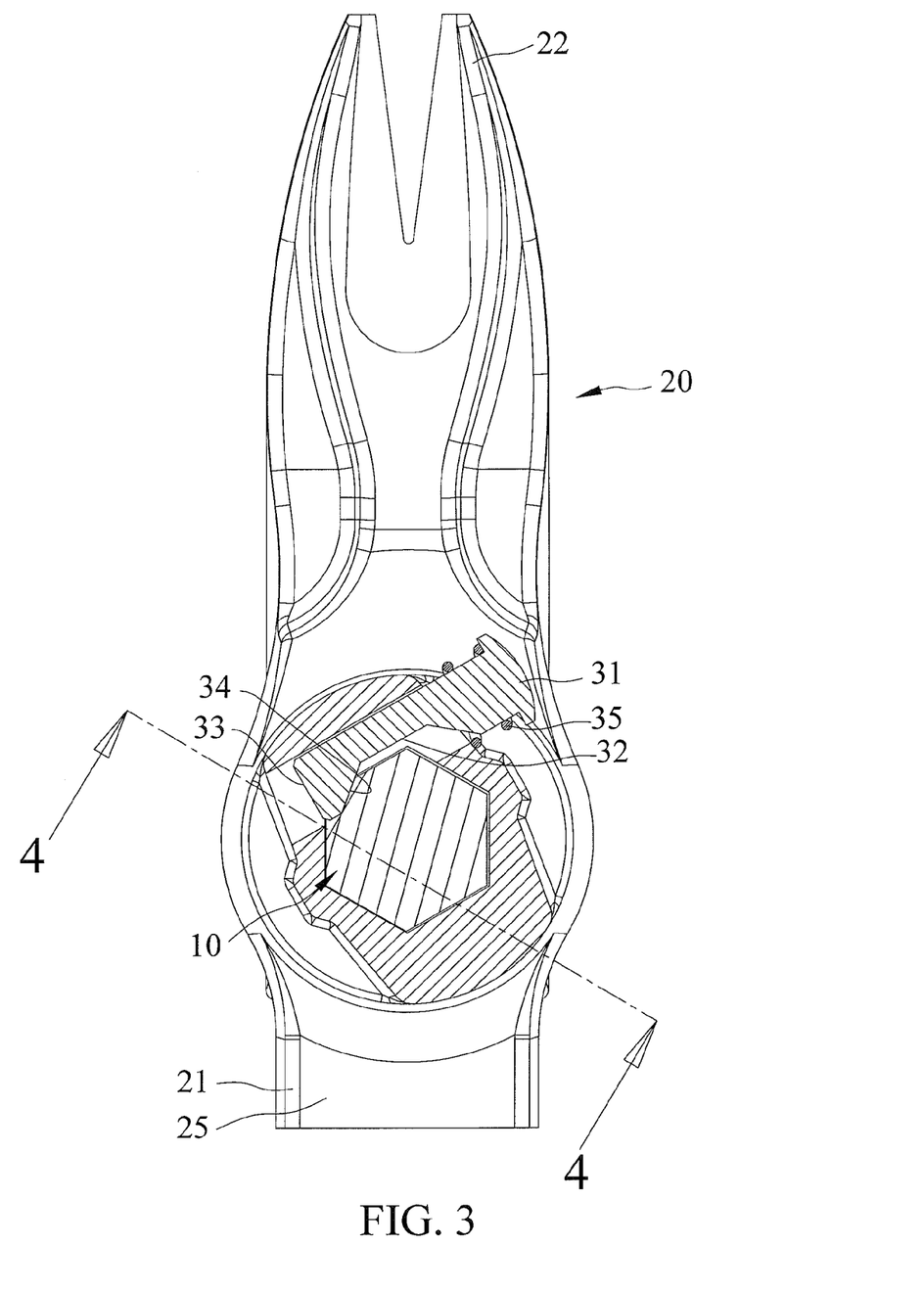
FIG. 3 is a cross-sectional view taken along line 3-3 of FIG. 1.
Figure 4:
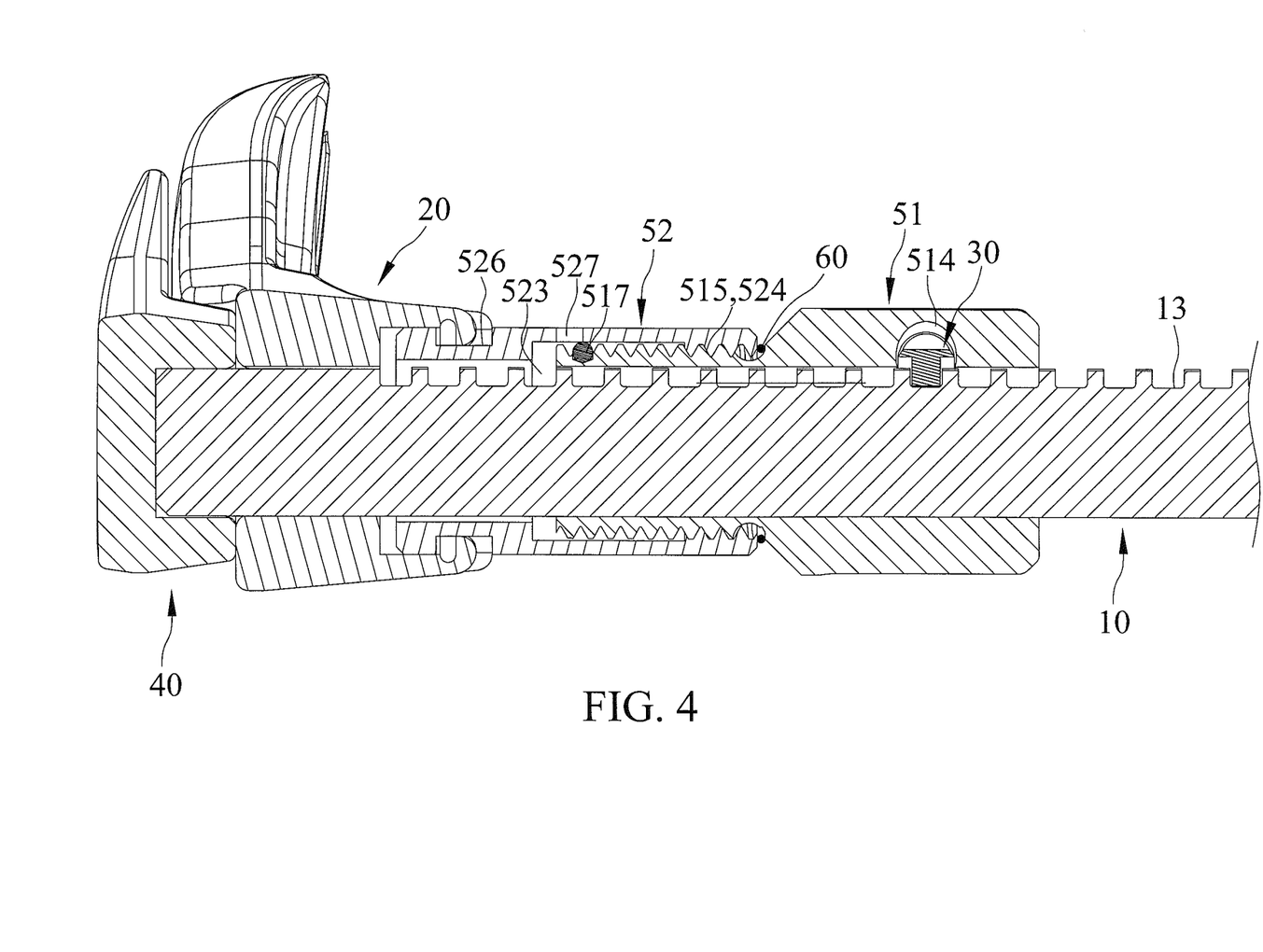
FIG. 4 is a cross-sectional view taken along line 4-4 of FIG. 3.
Figure 5:
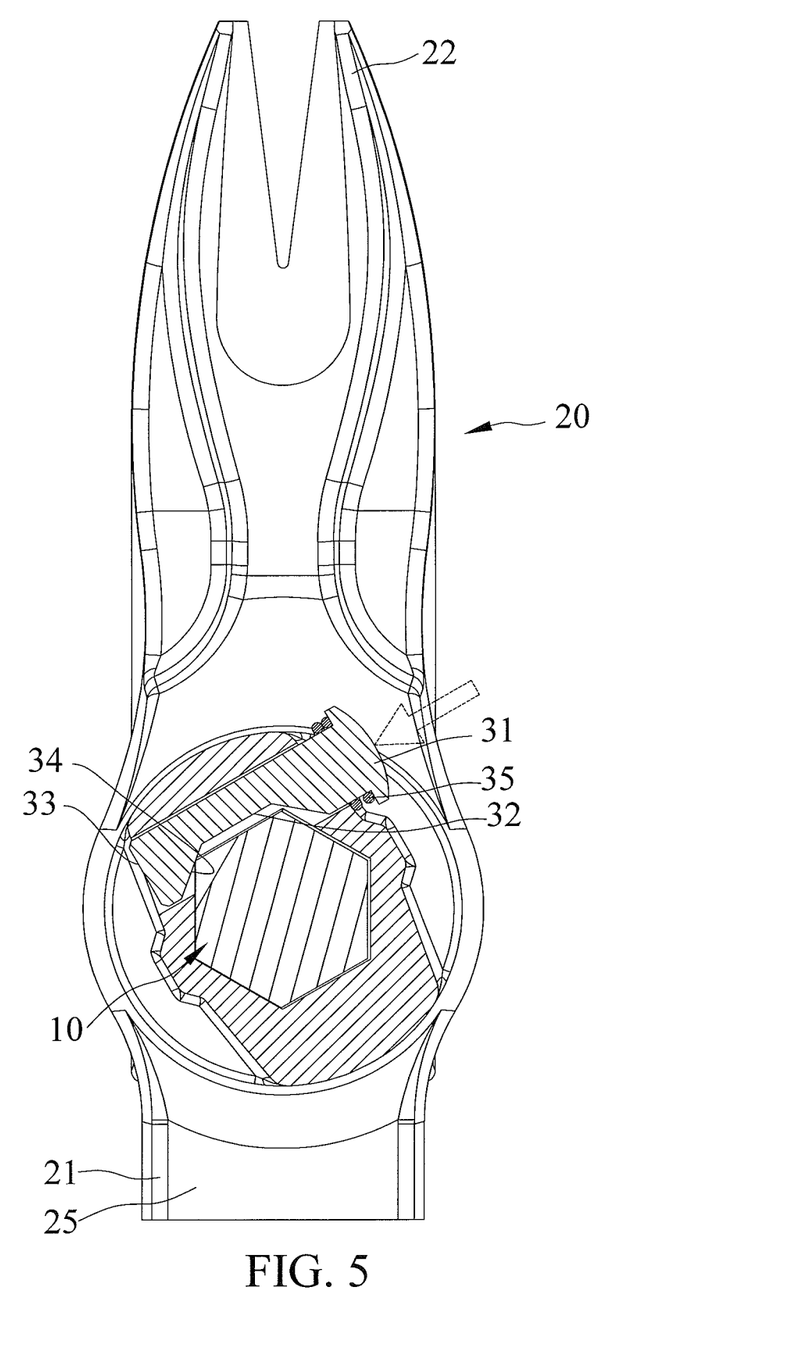
FIG. 5 is a cross-sectional view showing the multi-functional tool including a clutch operated to a position to detach from one of located grooves extended in a shank body.

The fine adjustment mechanism 50 for fine adjusting the pry bar 20 is mounted on the shank body 10 and engaged with the pry bar 20 and includes the at least one second receptacle 514 transversely extended therein. The pry bar 20 is adapted to be fine adjustably moved through a distance smaller than a pitch between two adjacent located grooves 13. The fine adjustment mechanism 50 includes first and second engaging members 51 and 52, and the second engaging member 52 is rotatably engaged with the first engaging member 51 and interconnects the first engaging member and the prying bar 20. The second receptacle 514 is extended in the first engaging member 51. Additionally, the shank body 10 is inserted through the first and second engaging members 51 and 52. The first engaging member 51 includes a first end 511, a second end 512, and a first hole 513 extended therethrough and from the first end 511 to the second end 512. The shank body 10 inserts through the first engaging member 51 through the first hole 513 The second engaging member 52 includes a first end 521, a second end 522, and a second hole 523 extended therethrough and from the first end 521 to the second end 522. Likewise, the shank body 10 inserts through the second engaging member 52 through the second hole 523. Furthermore, the first and second engaging members 51 and 52 are threadly engaged with each other. The first engaging member 51 includes an outer peripheral wall including an outer thread 515 and the second engaging member 52 includes a peripheral wall of the second hole 523 including an inner thread 524 respectively. Additionally, the first engaging member 51 further includes the outer peripheral wall including a recess 516 extended raidally therein and the second engaging member 52 includes an aperture 527 extended radially therethrough and connected with the second hole 523 respectively. A stopper 517 is insertable through the aperture 527 and disposed in the recess 516 and enclosed by the second engaging member 52. The stopper 517 has a spherical shape. Further, a ring 60 is disposed on the outer peripheral wall of the first engaging member 51 and reduces a travel length of the second engaging member 52 with respect to the first engaging member 51 and stops a relative movement of the first and second engaging members 51 and 52 to prevent disassembly of the stopper 517 from the fine adjustment mechanism 50 from the aperture 527. Additionally, the second engaging member 52 includes an outer peripheral wall including an anti-slip pattern 525 to prevent a user from slippage during the operation thereof and a groove 526 including an end of pry bar 20 latched thereon to prevent disengagement between the second engaging member 52 and the pry bar 20.

Figure 6:
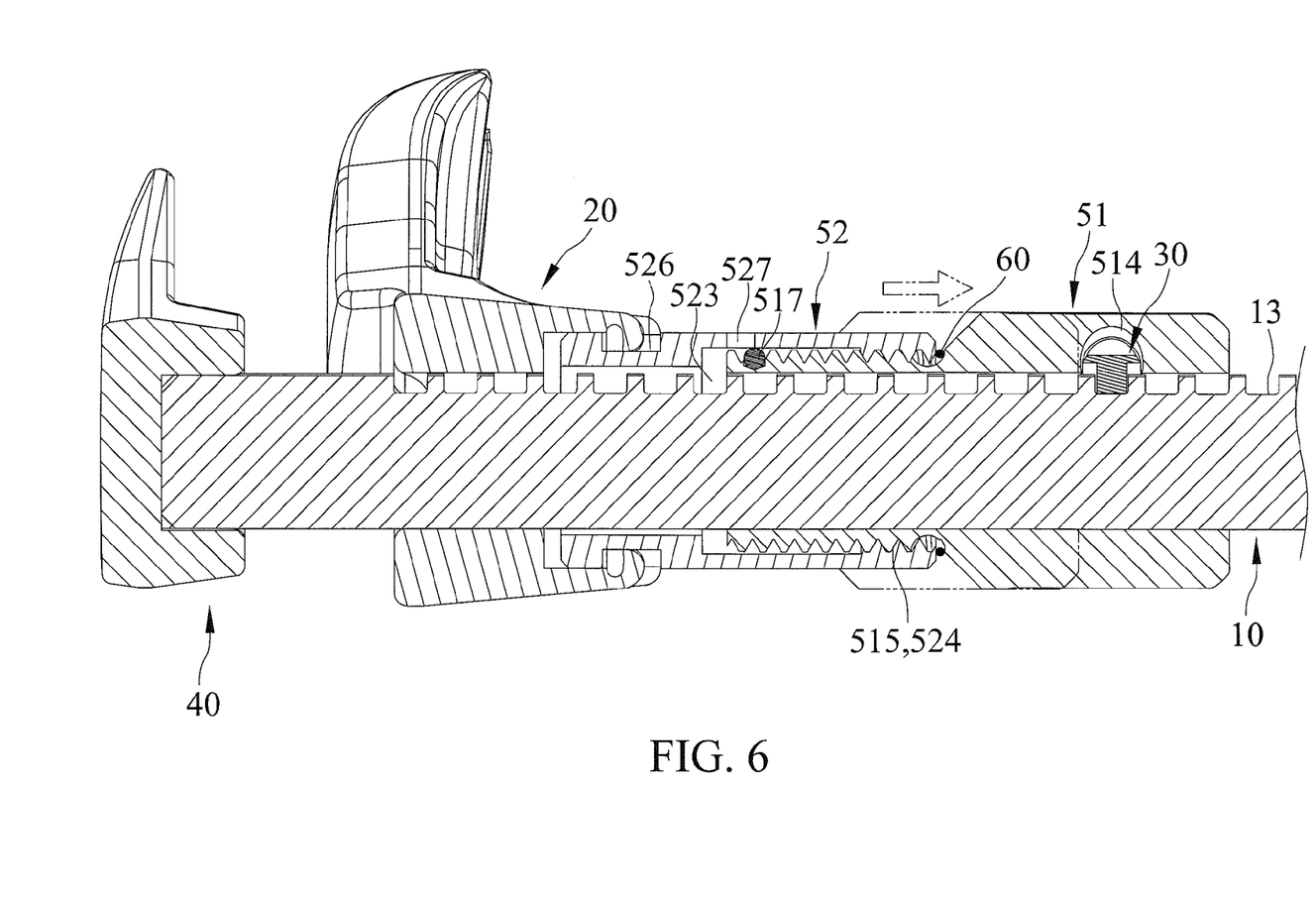
FIG. 6 is a cross-sectional view showing the multi-functional tool including a pry bar driven to a different position with respect to a foot hold than that shown in FIG. 4.

Therefore, further referring to FIG. 6, the pry bar 20 detaches from the foot hold 40 and slides relative to the shank body 10, when the clutch 30 is in the disengaging position. The location of the pry bar 20 on the shank body 10 is fixed when the clutch 30 is in the engaging position. The foot hold 40 is adapted for the multi-function tool placed on the ground stably. Accordingly, as the location of the pry bar 20 on the shank body 10 is adjusted further from the foot hold 40, the length of nails that are adapted to be pulled by the pry bar 20 could increase. Moreover, a user can grip various sizes of material by adjusting the distance between the pry bar 20 and the foot hold 40.

Although not shown, the foot hold 40 can be mounted on the shank body 10 in a manner that the foot hold 40 is pivotal with respect to the shank body 10. Preferably, the foot hold 40 is pivotal about a pivot axis transverse to a longitudinal length of the shank body 10 and in a plane coincident with the longitudinal length of the shank body 10.

Figure 7:
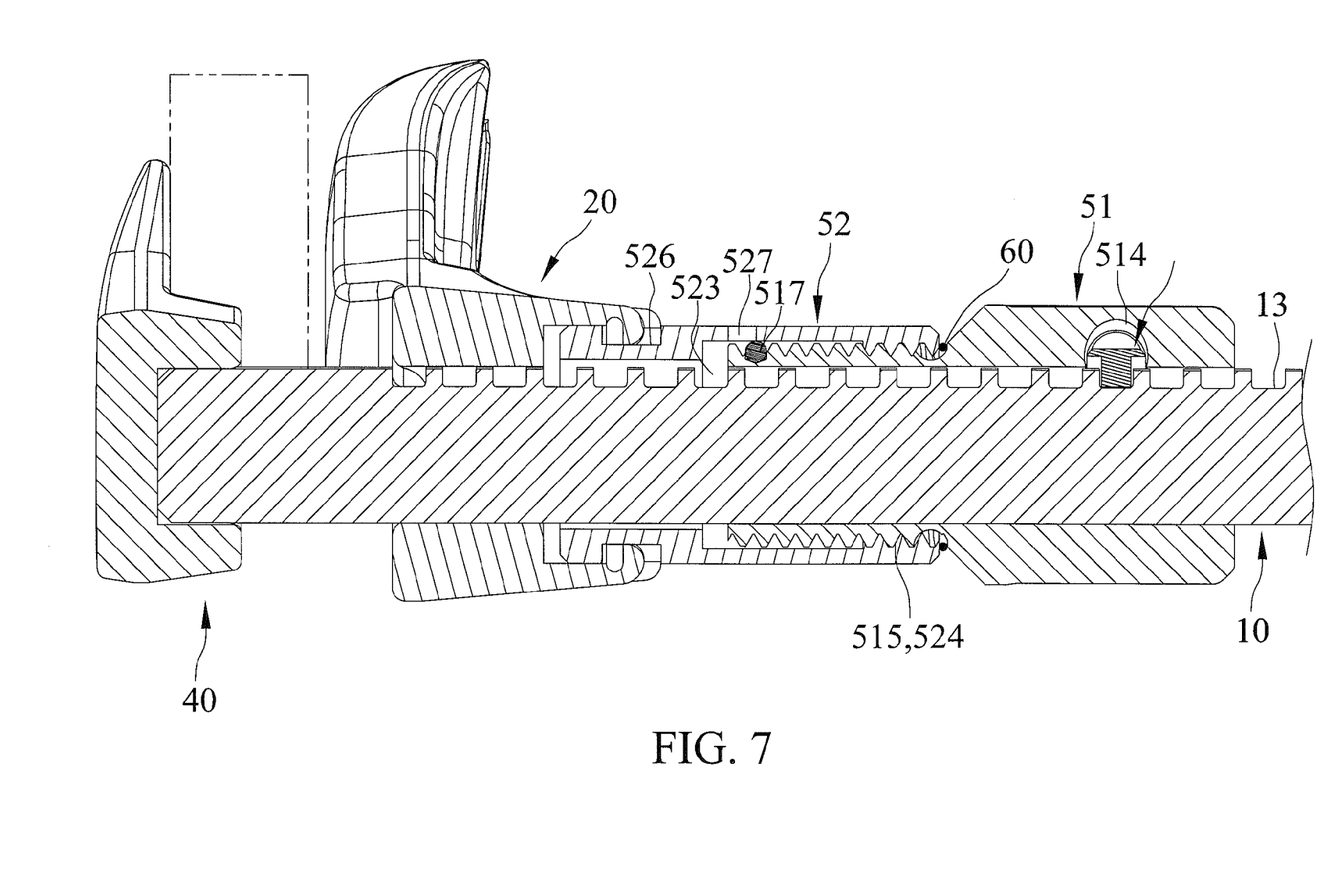
FIG. 7 illustrates an object to be held between the pry bar and the foot hold disposed therebetween, yet not securely, and a gap formed between the pry bar and the foot hold is smaller than a distance that the pry bar travels between two adjacent located grooves.
Figure 8:
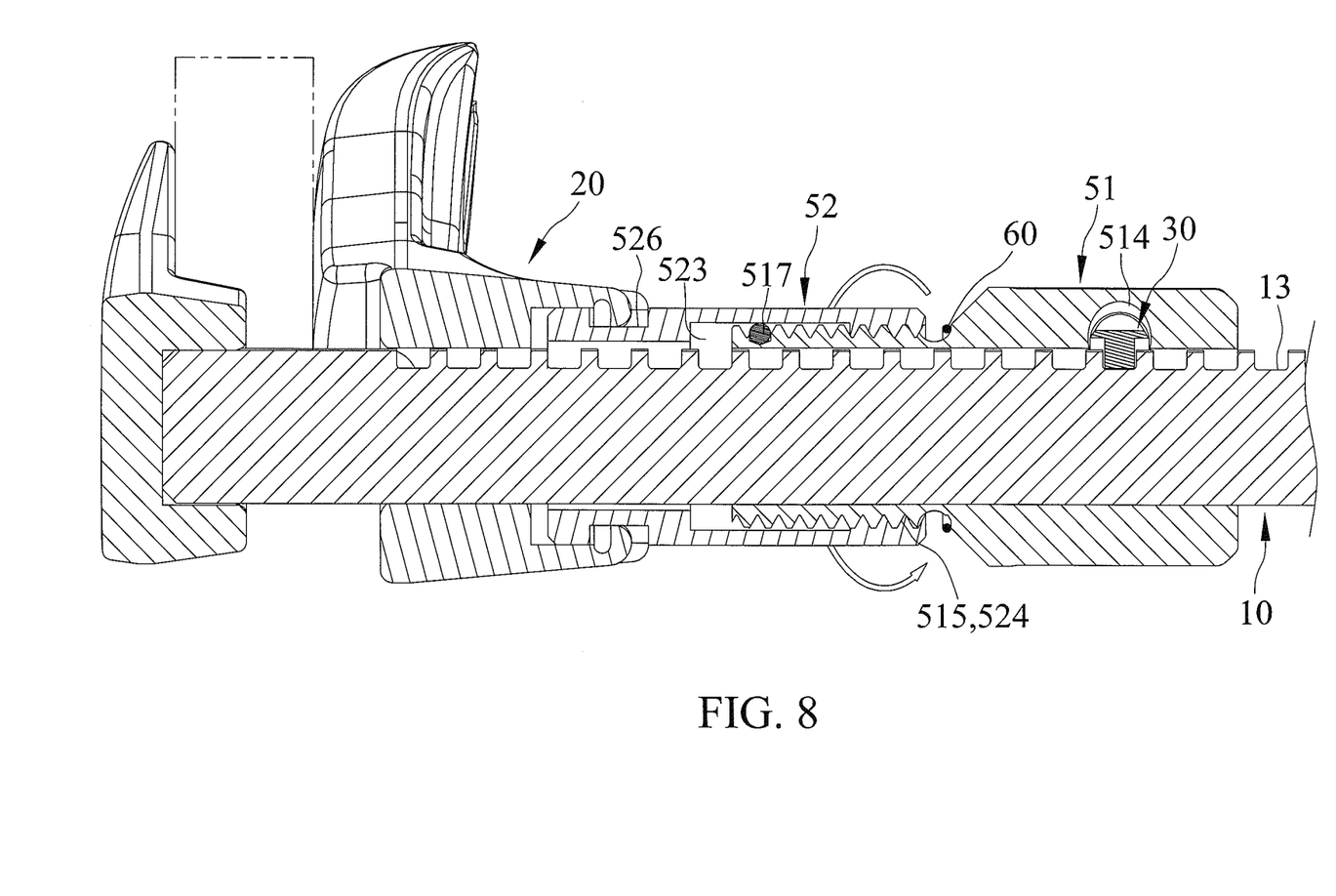
FIG. 8 is a continued view of FIG. 7 illustrating the fine adjustment operation of the pry bar, and showing the object securely held between the pry bar and the foot hold and showing that no gap exists.

In view of the forgoing, the pry bar 20 can be fine adjusted by the fine adjustment mechanism 50. In this regard, the pry bar 20 can be fine adjustably moved through a distance smaller than a pitch between two adjacent located grooves 13.

While the specific embodiments have been illustrated and described, numerous modifications come to mind without significantly departing from the spirit of invention, and the scope of invention is only limited by the scope of the accompanying claims.

What is claimed is:

1. A multi-function tool comprising:
    a shank body including a first end, a second end opposite to the first end, and a plurality of located grooves formed thereon and longitudinally aligned between the first and second ends thereof;
    a pry bar including a first section, a second section for prying, and a first receptacle longitudinally piercing the first section and adapted for the second end of the shank body inserted therethrough;
    at least one clutch;
    a foot hold mounted on the shank body; and
    a fine adjustment mechanism for fine adjusting the pry bar mounted on the shank body and engaged with the pry bar and including at least one second receptacle transversely extended therein;
    wherein the second end of the shank body is inserted through the first receptacle of the pry bar and installed to the foot hold;
    wherein the at least one clutch is disposed in the at least one second receptacle and alternatively engaged with a selective one of the plurality of located grooves of the shank body to fix the pry bar to the shank body in position; and
    wherein the pry bar is adapted to be fine adjustably moved through a distance smaller than a pitch between two adjacent located grooves.

2. The multi-function tool as claimed in claim 1, wherein the foot hold further comprises a first section, a second section extending from the first section and adapted for prying, and a connective portion formed on the first section for connecting to the second end of the shank body.

3. The multi-function tool as claimed in claim 2, wherein the connective portion includes a compartment for receiving the second end of the shank body, and at least one fastener inserted through the compartment and engaged with the shank body.

4. The multi-function tool as claimed in claim 3, wherein the compartment has at least one opening on a periphery thereof, with each of the at least one opening receiving the at least one fastener.

5. The multi-function tool as claimed in claim 1, wherein each clutch includes a protrusion on a side of an end thereof for exactly inserting into a selective one of the plurality of located grooves, and an abutted surface defined on the protrusion and abutting against an inner wall of the selective one of the plurality of located grooves for secure engagement of the pry bar with the shank body when the protrusion is inserted in the selective one of the plurality of located grooves.

6. The multi-function tool as claimed in claim 5, wherein each clutch includes a sunken portion provided on another end thereof and opposite to the protrusion, and wherein the shank body is inserted through the clutch and set in the first receptacle of the pry bar without contact with the clutch.

7. The multi-function tool as claimed in claim 6, wherein each clutch includes an elastic element, wherein when each clutch is in an engaging position and the elastic element is released, the protrusion is engaged with the selective one of the plurality of located grooves and the abutted surface is abutted against the inner wall of the selective one of the plurality of located grooves, wherein when each clutch is a disengaging position and the elastic element is pressed, the protrusion is disengaged from the selective one of the plurality of located grooves and the abutted surface is spaced from the inner wall of the selective one of the plurality of located grooves.

8. The multi-function tool as claimed in claim 1, wherein an interval between each of the plurality of located grooves alternatively being constant or not.

9. The multi-function tool as claimed in claim 1, wherein the second section of the pry bar with the cooperation of the second section of the foot hold is able to clamp materials with various sizes.

10. The multi-function tool as claimed in claim 1, wherein the fine adjustment mechanism includes first and second engaging members, with the shank body inserting through the first and second engaging members, with the second receptacle extended in the first engaging member, and wherein the second engaging member is rotatably engaged with the first engaging member and interconnects the first engaging member and the prying bar.

11. The multi-function tool as claimed in claim 10, wherein the first and second engaging members are threadly engaged with each other, with the first engaging member including an outer peripheral wall including an outer thread and with the second engaging member including a peripheral wall of the second hole including an inner thread respectively.

12. The multi-function tool as claimed in claim 11, wherein the first engaging member includes the outer peripheral wall including a recess extended radially therein and the second engaging member includes an aperture extended radially therethrough and connected with the second hole respectively, wherein a stopper is insertable through the aperture and disposed in the recess and enclosed by the second engaging member, and wherein a ring is disposed on the outer peripheral wall of the first engaging member and reduces a travel length of the second engaging member with respect to the first engaging member and stops a relative movement of the first and second engaging members to prevent disassembly of the stopper from the fine adjustment mechanism from the aperture.

13. The multi-function tool as claimed in claim 10, wherein the second engaging member includes an outer peripheral wall including an anti-slip pattern to prevent a user from slippage during the operation thereof.

14. The multi-function tool as claimed in claim 10, wherein the second engaging member includes a groove including an end of pry bar latched thereon to prevent disengagement between the second engaging member and the pry bar.

15. The multi-function tool as claimed in claim 7, wherein the fine adjustment mechanism includes first and second engaging members, with the shank body inserting through the first and second engaging members, with the second receptacle extended in the first engaging member, and wherein the second engaging member is rotatably engaged with the first engaging member and interconnecting the first engaging member and the prying bar.

16. The multi-function tool as claimed in claim 15, wherein an interval between each of the plurality of located grooves alternatively being constant or not.

17. The multi-function tool as claimed in claim 15, wherein the second section of the pry bar with the cooperation of the second section of the foot hold is able to clamp materials with various sizes.

* * * * *